United States Patent [19]

Miller

[11] Patent Number: 4,522,587

[45] Date of Patent: Jun. 11, 1985

[54] ROTATING MELTER

[75] Inventor: John H. Miller, Youngstown, Ohio

[73] Assignee: Hy-Way Heat Systems, Inc., Youngstown, Ohio

[21] Appl. No.: 573,287

[22] Filed: Jan. 23, 1984

[51] Int. Cl.³ .......................... F27B 7/10; F27B 14/00; E01C 19/45

[52] U.S. Cl. .......................... 432/114; 126/343.5 A; 165/92; 432/151

[58] Field of Search .............. 126/343.5 R, 343.5 A; 165/92; 432/114, 139, 151

[56] References Cited

U.S. PATENT DOCUMENTS

| | | | |
|---|---|---|---|
| 313,430 | 3/1885 | Kuhn | 165/92 |
| 930,786 | 8/1909 | Noonan | 165/92 |
| 1,271,153 | 7/1918 | Gapko | 165/92 |
| 1,717,465 | 6/1929 | O'Meara | 165/92 |
| 2,271,862 | 2/1942 | Hodgdon | 165/92 |
| 2,321,908 | 6/1943 | Gerlinger | 126/343.5 A |
| 2,540,250 | 2/1951 | Feldstein et al. | 165/92 |
| 2,594,142 | 4/1952 | Feldstein et al. | 165/92 |
| 3,272,649 | 9/1966 | Huser | 165/92 |

Primary Examiner—John J. Camby
Attorney, Agent, or Firm—Harpman & Harpman

[57] ABSTRACT

A horizontally disposed helical coil is positioned around and in communication with a hollow horizontal shaft extending lengthwise of a tank having oppositely disposed inlet and outlet ports. Hot oil is directed into the hollow shaft and circulated through the helical coil and a device rotates the hollow shaft and helical coil so that pieces of solidified coal tar or a similar material introduced through the inlet port of the tank and directed into the helical coil are simultaneously melted, agitated, and conveyed thereby toward the outlet port.

6 Claims, 4 Drawing Figures

ROTATING MELTER

BACKGROUND OF THE INVENTION

1. Technical Field

This invention relates to devices for melting coal tar and like materials.

2. Description of the Prior Art

No devices are known in which coal tar, coal tar enamels, sulphur, asphalt and similar materials have been rapidly and efficiently heated while being simultaneously agitated and conveyed through a tank-like structure. A number of prior art devices have utilized various configurations of coils arranged about a rotatable shaft and wherein the coil configurations are heated or cooled. See for example U.S. Pat. Nos. 313,430, 930,786, 1,717,465, 2,271,862, 2,540,250, 2,594,142 and 3,272,649.

The first of the above-mentioned patents discloses a beer mash tub in which a plurality of coils are mounted on a horizontally disposed shaft and steam is supplied to the several coils so as to stir and cook the mash.

U.S. Pat. No. 930,786 also has a plurality of coils on a horizontal shaft and like the first mentioned patent arranges the coils in unusual configurations with a number of sections arranged in radially spaced relation to one another.

U.S. Pat. No. 1,717,465 discloses a heated helical coil, the convolutions of which are widely spaced and supported by a plurality of cross arms, all for the purpose of heat treating animal offal.

U.S. Pat. No. 2,271,862 discloses a pasturizing device having a pair of coils positioned in spaced relation to one another and around a tubular member through which a heating fluid is selectively communicated with the several coils, pasturization of fluids such as milk and cream being specified.

U.S. Pat. No. 2,540,250, U.S. Pat. No. 2,594,142 and U.S. Pat. No. 3,272,649 all relate to devices for crystalizing sugar syrups, such as sucrose, and these patents disclose the use of various coil configurations in communication with a rotating shaft for heating individual coil convolutions by a heating fluid directed through the supporting shaft. None of the prior art patents disclose the novel concept of arranging a single helical coil with slightly spaced configurations, providing means for heating the same uniformly and for directing pieces of solid material thereinto capable of being liquified by heat supplied the helical coil by hot oil circulated therethrough and simultaneously conveying the pieces of the material longitudinally of the coil as the same are being melted, all as disclosed in the present invention.

SUMMARY OF THE INVENTION

A device for simultaneously melting, agitating and conveying materials such as coal tar and the like positions a helical coil with slightly spaced convolutions on a hollow shaft extending axially of an enclosing tank and has means directing pieces of the solid material to be melted into one end of the helical coil and supplies the helical coil with hot oil while simultaneously rotating the same. Blades on the exterior of the helical coil, which is heated by the hot oil circulated therethrough, provide for agitating the material in a stirring motion as it is melted and moved toward an outlet port in the tank.

DESCRIPTION OF THE PREFERRED EMBODIMENT

Figure 1:
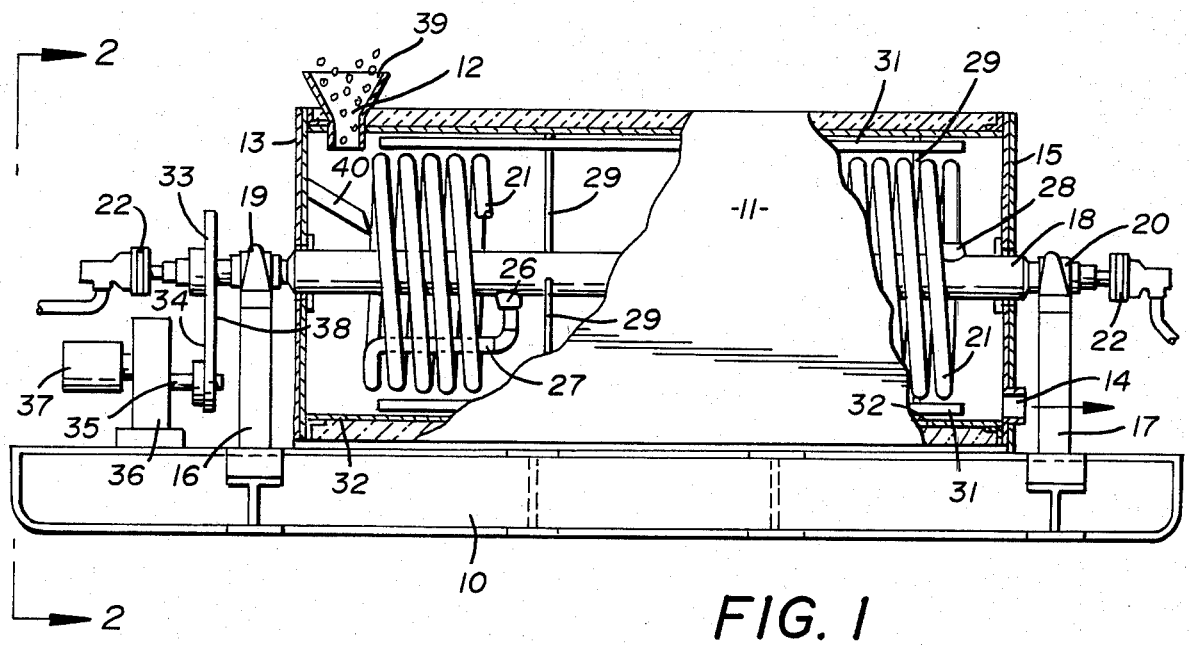
FIG. 1 is a side elevation with parts broken away and parts in cross section illustrating the rotating melter.
Figure 2:
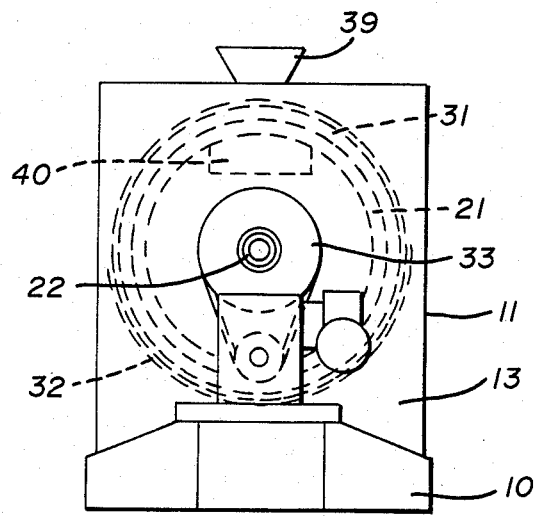
FIG. 2 is an end elevation on line 2—2 of FIG. 1.
Figure 3:
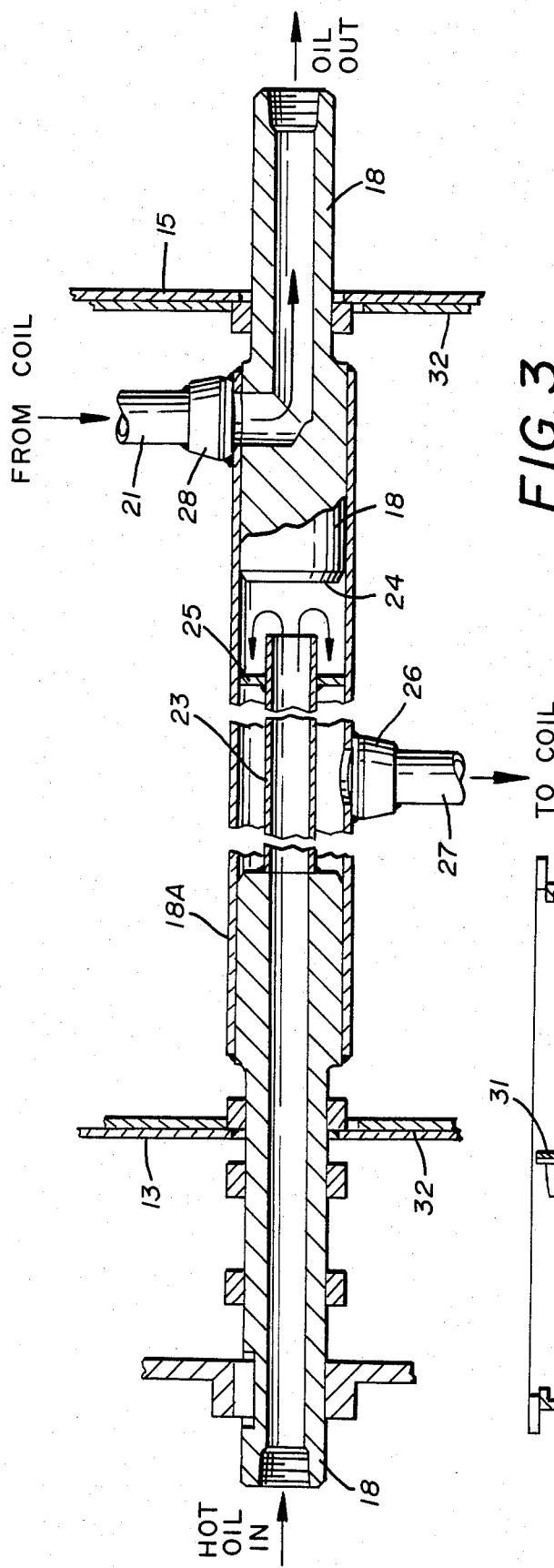
FIG. 3 is an enlarged side elevation of the hollow horizontal shaft of FIG. 1 with parts broken away and parts in cross section.

In the form of the invention chosen for illustration herein, the rotating melter comprises a portable device mounted on a double skid base 10 and consisting of a housing 11 having an inlet port 12 in its upper surface adjacent a left end 13 of the housing 11 and an outlet port 14 in the lower portion of a right end portion 15 of the housing 11. A pair of vertical stands 16 and 17 are positioned on the double skid base 10 in spaced relation to the end 13 and 15 respectively of the housing 11 and a hollow shaft 18 is rotatably positioned in journals 19 and 20 respectively formed on the upper ends of the vertical stands 16 and 17. The hollow shaft 18 extends through openings in the ends 13 and 15 of the housing 11 and supports a helical coil 21, the convolutions of which are spaced radially with respect to the axis of the hollow shaft 18 and slightly spaced with respect to one another. The ends of the helical coil 21 communicate with the hollow shaft 18 as best shown in enlarged detail in FIG. 3 of the drawings so that hot oil at a temperature of approximately 600° F. from a suitable hot oil heater, not shown, may be introduced thereinto through a fitting 22 mounted on the left hand end portion of the hollow shaft 18 which revolves in the fitting 22. The hot oil flows inwardly of the left hand end portion of the hollow shaft 18 as best shown in FIG. 3 of the drawings and continues inwardly through a tubular member 23 which extends substantially through an intermediate tubular member 18A of the hollow shaft 18 to a point adjacent the right hand end portion of the hollow shaft 18 and its inner end 24. The tubular member 23 is supported by a spider 25 and the oil flowing therefrom will thus reverse its flow as indicated by the arrows in FIG. 3 and flow backwardly through the intermediate tubular member 18A to an outlet fitting 26 which is connected with one end of the helical coil 21 by a tubular member 27 as best illustrated in FIG. 1 of the drawings. The hot oil then flows continuously through the helical coil 21 to the opposite, right, end thereof which communicates by way of a secondary fitting 28 with the right hand end portion of the hollow shaft 18 and flows outwardly thereof as indicated by the arrows in FIG. 3 of the drawings and is returned to the hot oil heater, not shown.

Figure 4:
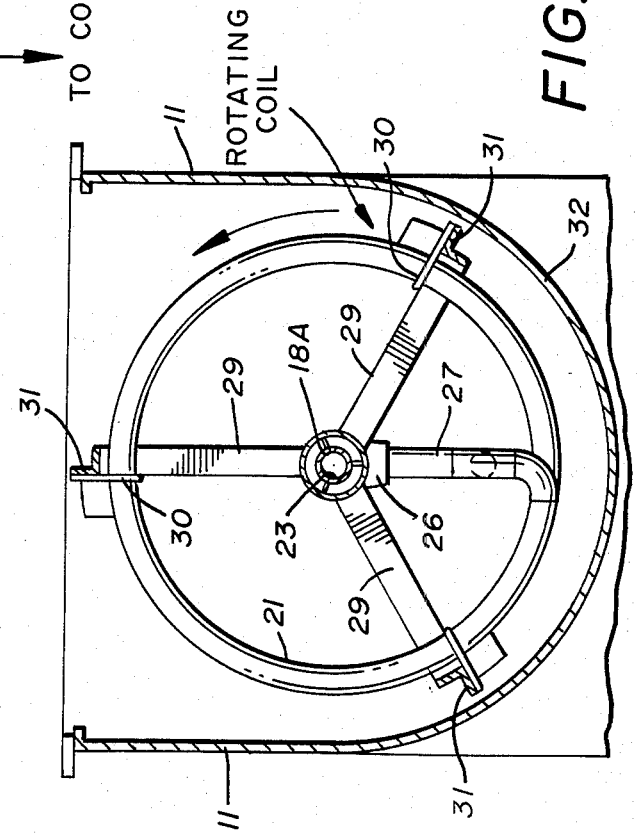
FIG. 4 is an enlarged vertical section through the helical coil and agitator blades seen in FIG. 1 of the drawings.

The helical coil 21 is supported in uniformly spaced relation to the hollow shaft 18 by a plurality of radially extending arms 29 which are joined at their innermost ends to the intermediate tubular member 18A and attached at their outer ends to circumferentially spaced points on some convolutions of the helical coil 21 by U-shaped clips 30. The outer ends of the radial extending arms 29 are attached to longitudinally extending blades 31 which are of right angular configuration in cross section as best shown in FIGS. 1 and 4 of the drawings.

Still referring to these Figures it will be seen that the housing 11 has a curved lower half bottom portion 32 of a diameter slightly greater than the overall size of the helical coil 21, the support arms 29 and the blades 31 carried thereon and it will be seen that when rotary motion is imparted the hollow shaft 18, the helical coil 21 supported on the arms 29 along with the blades 31 will thus revolve and preferably in a counter clock-wise direction with the blades 31 moving in closely spaced relation to the curved bottom 32 of the housing 11. In order that such rotating motion can be imparted the hollow shaft 18, a sprocket 33 is mounted on the hollow shaft 18 to the left of the journal 19, as seen in FIG. 1 of the drawings, and directly above a secondary sprocket 34 on a driven shaft 35 of a gear box 36 which in turn is driven by a motor 37. A chain 38 connects the sprockets 33 and 34 as will be understood by those skilled in the art.

Energization of the motor 37, which is preferably electric, will thus impart the desired relatively slow revolving action to the hollow shaft 18 and thus rotate the helical coil 21. The arrangement of the convolutions of the helical coil 21 is such that counter clock-wise rotation of the coil will cause pieces of solidified coal tar or similar materials directed into the interior thereof to be conveyed from left to right of the coil as seen in FIG. 1 of the drawings, while the solidified pieces of coal tar or similar material are melted. Small pieces of the melting material that fall through the small space between the convolutions of the helical coil 21 will be constantly moved by the blades 31 as heretofore described and with reference to the relatively close spacing thereof with respect to the curved bottom 32 of the housing 11 in which the rotatable helical coil is positioned. A funnel shaped member 39 communicates with the inlet port 12 of the housing as heretofore described so that the pieces of the solidified material to be melted may be readily directed thereinto. A directional chute or baffle 40 is attached to the housing 11 below the funnel-shaped member 39 and extends to a point slightly within the end of the helical coil 21.

It will occur to those skilled in the art that the rotating melter disclosed herein is particularly suitable for liquefying coal tars and similar materials and particularly those materials that contain a mineral content. Coal tars commonly contain powdered minerals, such as talc, which settle out of the coal tar when heated and melted. Such minerals are desirably kept in suspension and therefore the need of agitation which the present device provides along with the efficient and very rapid heating of the coal tar or like material. The minerals in the coal tar are kept in suspension by the agitation provided by the rotating blades and they are progressively moved from inlet end to outlet end of the device by the conveyor-like action of the slightly spaced convolutions of the helical coil 21 which provides the heat necessary for liquefying the coal tar or similar material.

Other materials that are efficiently melted by the device include sulphur, which as a waste product from gas wells, can be efficiently liquefied and used as an asphalt substitute or extender for asphalt such as used in pavements as a binder. Asphaltic materials are also efficiently melted in the rotating melter of the invention. Other materials that may be efficiently handled by the rotating melter of the invention include coke oven residuals and coal dust in an asphaltic or coal tar medium as will occur to those skilled in the art.

Having thus described my invention what I claim is:

1. In an apparatus for simultaneously conveying, agitating and melting pieces of solidified coal tar or like material of a known size, an elongated material receiving tank, a hollow rotatable shaft extending horizontally in said tank, a helical coil within said tank forming a heat exchanger and spiral conveyor and connected with said rotatable shaft for rotation of said coil with said shaft in coaxial relation thereto, said helical coil having the convolutions thereof spaced slightly with respect to one another a distance less than the known size of said pieces of material, means in said tank adjacent an inlet opening therein for directing said pieces of material into one end of said helical coil, said tank having an outlet in said tank adjacent the other end of said helical coil and continuously extending means positioned horizontally in said tank and connected with said shaft for rotation with said shaft, said means being spaced radially of said helical coil and adjacent at least one surface of said tank whereby pices of said material smaller than the space between the convolutions of said coil are moved in an annular path in said tank, means for introducing hot oil into said hollow rotatable shaft and receiving the same therefrom and means in said hollow rotatable shaft for directing said hot oil into, through and out of said helical coil and means for rotating said hollow, rotatable shaft on its longitudinal axis.

2. The apparatus for simultaneously conveying agitating and melting pieces of solidified coal, tar, or like material of a known size set forth in claim 1 and wherein said inlet opening is a size substantially larger than the space between said slightly spaced convolutions of said helical coil.

3. The apparatus for simultaneously conveying agitating and melting pieces of solidified coal, tar, or like material set forth in claim 1 and wherein said means in said tank adjacent said inlet opening therein for directing said pieces of material into one end of said helical coil comprises a directional chute extending within said one end of said helical coil.

4. The apparatus for simultaneously conveying agitating and melting pieces of solidified coal, tar, or like material set forth in claim 1 and wherein said means positioned horizontally in said tank and connected with said shaft for rotation with said shaft comprise continuous cross sectionally L-shaped elongated members arranged with portions of said cross-sectionally L-shaped members lying on radial planes with respect to said hollow rotatable shaft.

5. The apparatus for simultaneously conveying agitating and melting pieces of solidified coal, tar, or like material set forth in claim 1 and wherein circumferentially spaced radially extending arms attached to said rotatable shaft position and support said helical coil in uniformly spaced coaxial relation to said hollow rotatable shaft.

6. The apparatus for simultaneously conveying agitating and melting pieces of solidified coal, tar, or like material set forth in claim 1 and wherein said hollow rotatable shaft consistss of a pair of end portions and a first tubular member extending therebetween and secured thereto, one of said end portions having a passageway axially thereof and the other of said end portions having a solid portion forming a plug and an axial passageway extending inwardly of said end portion toward said portion forming said plug and communicating with a second passageway at right angles thereto, a tubular member in communication with said axial passageway in said first mentioned end portion and extending inwardly of said first tubular member to a point spaced with respect to said plug portion of said second mentioned end portion, said helical coil forming a heat exchanger and spiral conveyor and connected with said rotatable shaft being in communication with said first tubular member of said hollow rotatable shaft and with said right angular passageway in said second mentioned end portion and forming said means in said hollow rotatable shaft for directing said hot oil thereinto through and out of said helical coil.

* * * * *